United States Patent
Yao et al.

(10) Patent No.: US 10,816,351 B1
(45) Date of Patent: Oct. 27, 2020

(54) GENERATION OF TRIP ESTIMATES USING REAL-TIME DATA AND HISTORICAL DATA

(71) Applicant: Uber Technologies, Inc., San Francisco, CA (US)

(72) Inventors: Shijing Yao, El Cerrito, CA (US); Xiao Cai, San Bruno, CA (US)

(73) Assignee: Uber Technologies, Inc., San Francisco, CA (US)

( * ) Notice: Subject to any disclaimer, the term of this patent is extended or adjusted under 35 U.S.C. 154(b) by 254 days.

(21) Appl. No.: 15/678,250

(22) Filed: Aug. 16, 2017

Related U.S. Application Data (63) Continuation of application No. 15/650,759, filed on Jul. 14, 2017, now abandoned.

(51) Int. Cl.
- G01C 21/36 (2006.01)
- G01C 21/34 (2006.01)
- G08G 1/0968 (2006.01)
- G06N 3/08 (2006.01)

(52) U.S. Cl.
CPC ..... G01C 21/3492 (2013.01); G01C 21/3446 (2013.01); G01C 21/3484 (2013.01); G01C 21/34 (2013.01)

(58) Field of Classification Search
CPC .............................. G06N 20/00; G08G 1/0129
See application file for complete search history.

(56) References Cited

U.S. PATENT DOCUMENTS

| | | | |
|---|---|---|---|
| 6,317,686 B1 | 11/2001 | Ran | |
| 10,072,938 B2* | 9/2018 | Tian | G01C 21/3697 |
| 10,127,496 B1* | 11/2018 | Fu | G06N 3/08 |
| 2010/0299177 A1 | 11/2010 | Buczkowski et al. | |
| 2011/0246404 A1* | 10/2011 | Lehmann | G06Q 50/14 706/21 |
| 2013/0110392 A1* | 5/2013 | Kosseifi | G01C 21/3415 701/410 |
| 2014/0095066 A1* | 4/2014 | Bouillet | G08G 1/123 701/465 |
| 2014/0136088 A1* | 5/2014 | Nikovski | G01C 21/3492 701/117 |

(Continued)

FOREIGN PATENT DOCUMENTS

WO    WO 2016/162781 A1    10/2016

*Primary Examiner* — Peter D Nolan
*Assistant Examiner* — Ce Li Li
(74) *Attorney, Agent, or Firm* — Fenwick & West LLP (57) ABSTRACT

A system uses machine models to estimate trip durations or distance. The system trains a historical model to estimate trip duration using characteristics of past trips. The system trains a real-time model to estimate trip duration using characteristics of recently completed trips. The historical and real-time models may use different time windows of training data to predict estimates, and may be trained to predict an adjustment to an initial trip estimate. A selector model is trained to predict whether the historical model, the real-time model, or a combination of the historical and real-time models will more accurately estimate a trip duration, given features associated with a trip duration request, and the system accordingly uses the models to estimate a trip duration. In some embodiments, the real-time model and the selector may be trained using batch machine learning techniques which allow the models to incorporate new trip data as trips complete.

14 Claims, 8 Drawing Sheets

(56) References Cited

U.S. PATENT DOCUMENTS

| | | |
|---|---|---|
| 2014/0288821 A1* | 9/2014 | Modica .................. G08G 1/127 701/465 |
| 2014/0309914 A1 | 10/2014 | Scofield et al. |
| 2015/0241242 A1* | 8/2015 | Rings ..................... G01C 21/20 701/465 |
| 2016/0129787 A1* | 5/2016 | Netzer ............. G08G 1/096741 701/36 |
| 2016/0202074 A1* | 7/2016 | Woodard ............... G01C 21/34 701/465 |
| 2016/0216123 A1 | 7/2016 | Liao et al. |
| 2017/0138751 A1* | 5/2017 | Martyniv ............... G06Q 10/02 |
| 2017/0243121 A1* | 8/2017 | Lai ....................... G08G 1/0141 |
| 2018/0209808 A1* | 7/2018 | Wang ................... G06K 9/6256 |
| 2018/0259345 A1* | 9/2018 | Wang ................... G08G 1/0112 |
| 2018/0357736 A1* | 12/2018 | Sun ........................ G06N 5/003 |
| 2019/0095785 A1* | 3/2019 | Sarkar ................... G06N 20/00 |
| 2019/0107404 A1* | 4/2019 | Zhong ................... G06N 20/00 |
| 2019/0204102 A1* | 7/2019 | Wang ................ G01C 21/3697 |
| 2019/0257658 A1* | 8/2019 | Wang ................... G08G 1/0141 |
| 2020/0011692 A1* | 1/2020 | Sun .................... G01C 21/3492 |
| 2020/0116504 A1* | 4/2020 | Sun .................... G01C 21/3407 |

\* cited by examiner

GENERATION OF TRIP ESTIMATES USING REAL-TIME DATA AND HISTORICAL DATA

CROSS-REFERENCE TO RELATED APPLICATIONS

This application is a continuation of U.S. application Ser. No. 15/650,759, filed Jul. 14, 2017, which is hereby incorporated by reference in its entirety.

BACKGROUND

Field of Art

This disclosure relates generally to estimating trip duration, and in particular to estimating trip duration by using machine learning to combine historical trip data and real-time trip data.

Description of Art

Computerized systems provide a means of determining routes to destination addresses. The computerized systems can find user-specified addresses on a map and/or provide routes between multiple addresses. Mapping and routing can have various applications, such as helping groups of people coordinate travel and directing providers (e.g., people or entities that transport a user, product, and/or service) to locations the providers may be unfamiliar with.

Existing automated methods for generating trip duration estimates are not always accurate. Many conventional methods for generating trip duration estimates rely on graphs that represent known roads and/or transportation routes and associated travel times. In such cases, an incomplete or non-existent graph can dramatically alter the results of a trip duration estimation, and may even preclude a duration estimation altogether. Existing methods may also depend on an assumption that a user or provider will follow a specific predicted route, and may only predict a trip duration along the predicted route. Furthermore, the methods do not account for extra travel time that may be incurred at intersections, transitioning between different road classes (e.g., between local roads and highways), and/or picking up and dropping off users.

SUMMARY

The above and other needs are met by methods, non-transitory computer-readable storage media, and computer systems for improving trip duration estimates.

Examples described herein provide a computer-implemented method for estimating trip durations based on real-time trip data and historical trip data. The method includes calculating a first estimated trip duration for a trip using a real-time model and calculating a second estimated trip duration for the trip using a historical model. The method also includes determining weighting factors associated respectively with the trip duration estimated by the real-time model and the trip duration estimated by the historical model, the weighting factors being based on characteristics of the trip, the first estimated trip duration, and the second estimated trip duration. The method further includes predicting a final estimated trip duration by using the weighting factors to combine the first estimated trip duration and the second estimated trip duration.

Examples described herein additionally provide a method for training a real-time model using machine learning techniques. For each sequential time period, the method includes iteratively training a model for estimating a duration of a trip within a next time period based on characteristics of the trip. The training may include identifying a current training window for the model based on a current time period, identifying a set of completed trips associated with the training window (each trip having a known duration and characteristics), and training the model to predict trip durations based on the set of completed trips. The method further comprises receiving a request to estimate a duration of a new trip during the next time period and determining a new trip duration for the new trip by applying characteristics of the new trip to the model.

Another example described herein provides a method for estimating confidence intervals of trip durations. The method includes calculating a first set of confidence intervals for trip durations using a real-time model, calculating a second set of confidence intervals for trip durations using a historical model, and calculating a final confidence interval by applying a selector model which determines whether the real-time model or the historical model is likely to more accurately predict current trip durations.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

A system trains models to estimate trip durations using real-time trip data and historical trip data. A historical model is trained to estimate trip durations with training data that may include characteristics about trips that have completed in a prior time period, such as within a past week, month, year, etc. A real-time model for estimating trip durations is frequently retrained using characteristics of recently completed trips as training data. In one embodiment, the real-time model is trained using batches of data collected from recent trips. That is, training data may be incorporated into the real-time model to account for recent trip activity. The historical model and the real-time model may also be trained to adjust or improve a prediction from another trip prediction system, such as a network-based trip estimate. The network-based trip estimate may predict an initial trip duration estimate by modeling road segments as edges between nodes in a graph, and the historical and real-time models may learn adjustments to the initial trip duration estimates using different features and more recent data than the initial trip duration estimates.

A selector is also trained to evaluate a preference or combination between the real-time and historical estimates using machine learning techniques, in accordance with an embodiment. A selector is a model that is trained to determine whether the real-time model, historical model, or a combination of the two will more accurately estimate a trip duration, given characteristics of a query for a duration of an upcoming trip.

In some embodiments, multiple real-time models and selector models are trained by the system such that while a real-time model and a selector are being used to predict trip durations, another real-time model and associated selector are being trained for a subsequent time period. By switching between models in a training phase and models in a prediction phase, real-time models and selector models may make predictions based on current data and the system does not need to periodically pause its production of trip duration estimates to retrain models.

It is noted that, although the present description relates to determining trip duration estimations, methods described herein may be applicable in many other forecasting situations. Training real-time models, historical models and selector models using different features, can allow the system to predict estimated travel distance, market demand, market supply, and may be applied for other forecasting problems.

Figure 1:
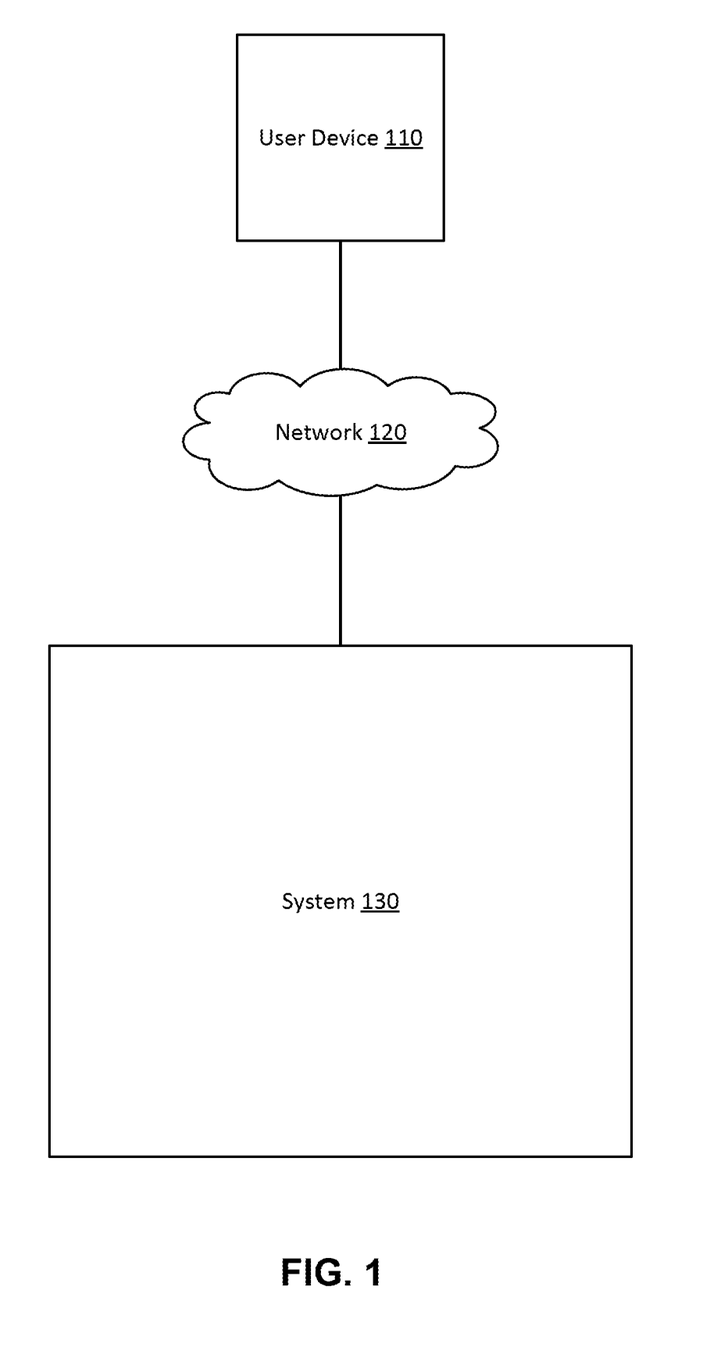
FIG. 1 is a high-level block diagram of a system environment for a system, in accordance with an embodiment.

FIG. 1 is a high-level block diagram of a system environment for a system 130, in accordance with an embodiment. FIG. 1 includes a user device 110, a network 120, and the system 130. For clarity, only one user device 110 is shown in FIG. 1. Alternate embodiments of the system environment can have any number of user devices 110 as well as multiple systems 130. The functions performed by the various entities of FIG. 1 may vary in different embodiments. The system 130 may provide routing, direction, and timing information to a user operating the user device 110. In some embodiments, the system 130 may coordinate travel for a user, for example, by matching the user with a provider who can transport the user, items, or services to a destination requested by the user. In some embodiments, the system 130 may report timing information about a requested route to the user, for example, by providing the user with a trip duration estimate and/or an estimated time of arrival (ETA) in response to origin and destination locations provided by the user. An ETA may also be determined by adding an estimated trip duration to a current time. For example, an estimated trip duration of 15 minutes may be added to the current time of 5:20 to determine an ETA of 5:35. In cases in which the system 130 matches the user with a provider to transport the user to a destination, the system 130 may provide an ETA of the provider at a pickup location based on a route generated to connect the provider's current location to the pickup location.

The system 130 can estimate a duration of time that a trip from a given origin to a given destination will take. In some embodiments the system uses machine models to predict a trip duration. The system 130 may use a combination of real-time models and historical models to predict an estimated trip duration. In some embodiments, the system 130 may use a real-time model and/or a historical model to adjust a trip duration estimate determined by applying a network-based estimation algorithm. The network-based estimation may use a graph that includes nodes and edges to represent road segments, intersections, and the like. To estimate the trip duration with the network-based estimation, the graph is traversed from the origin of the trip to the destination along road segments of the route.

A user may enter origin and destination information and/or request transportation from the system 130 through a user device 110. User devices 110 can be personal or mobile computing devices, such as smartphones, tablets, or notebook computers. In some embodiments, the user device 110 executes a client application that uses an application programming interface (API) to communicate with the system 130 through the network 120.

As one example use, the system 130 coordinates travel and may provide estimated travel time and ETA for the travel. In some embodiments, a user can make a trip request to the system 130 through operation of the user device 110. For example, a trip request may include one or more of user identification information, a number of passengers for the trip, a requested type of the provider (e.g., a vehicle type or service option identifier), the current location and/or the pickup location (e.g., a user-specific location, or a current location of the user device 110), and a trip destination. The current location of the user device 110 may be designated by the user or detected using a location sensor of the user device 110 (e.g., a global positioning system (GPS) receiver).

User devices 110 may interact with the system 130 through client applications configured to interact with the system 130. The client applications of the user devices 110 can present information received from the system 130 on a user interface, such as a map of the geographic region, the current location of the user device 110, estimated trip duration, and/or an ETA associated with a trip request. The client application executing on the user device 110 may be able to determine the current location and provide the current location to the system 130.

The user devices 110 can communicate with the system 130 via the network 120, which may comprise any combination of local area and wide area networks employing wired or wireless communication links. In some embodiments, all or some of the communication on the network 120 may be encrypted.

Figure 2:
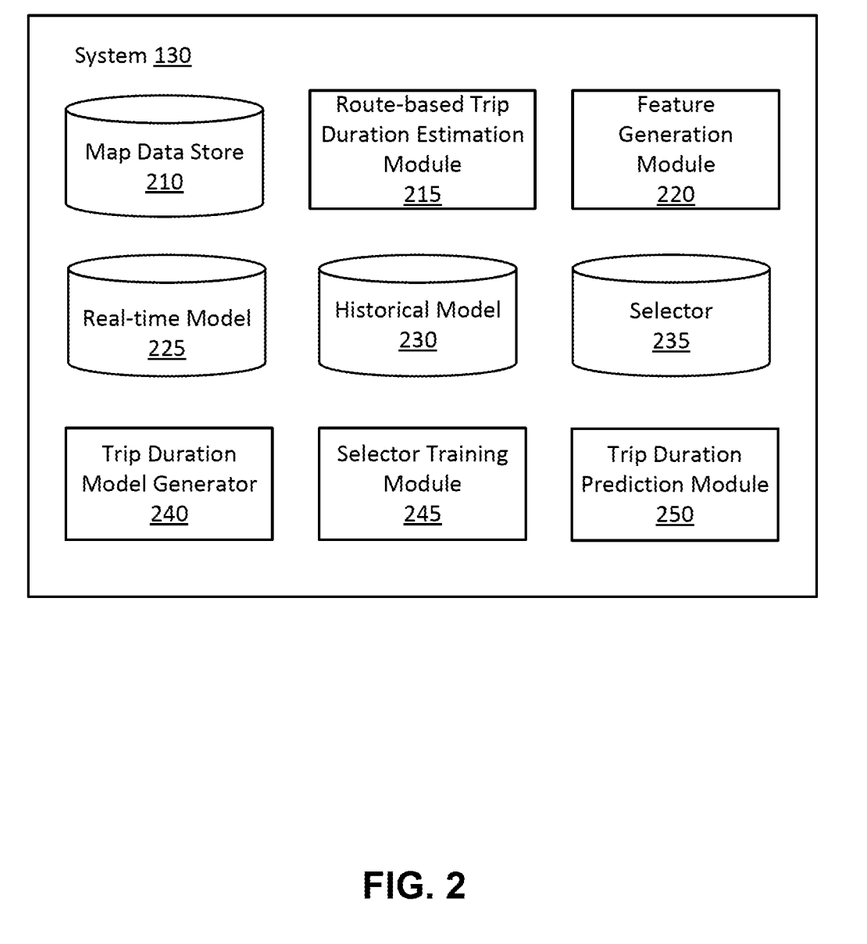
FIG. 2 is a high-level block diagram of a system architecture, in accordance with an embodiment.

FIG. 2 is a high-level block diagram of a system architecture for the system 130, in accordance with an embodiment. The system 130 includes various modules and data stores for estimating trip durations. The system comprises a map data store 210, a route-based trip duration estimation module 215, a feature generation module 220, a real-time model 225, a historical model 230, a selector 235, a trip duration model generator 240, a selector training module 245, and a trip duration prediction module 250. The system 130 may include services and other functions for other features that are not shown herein. Likewise, computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 2 and the functionality of the components as described herein may be distributed differently from the description herein.

The map data store 210 stores maps of geographic regions in which the system 130 estimates trip duration and/or offers trip coordination services. The maps contain information about roads within the geographic regions. For the purposes of this disclosure, roads can include any route between two places that allow travel by foot, motor vehicle, bicycle, or another form of travel. Examples of roads include streets, highways, freeways, trails, bridges, tunnels, toll roads, and/or crossings. Roads may be restricted to certain users, or may be available for public use. Roads can connect to other roads at intersections. An intersection is a section of one or more roads that allows a user to travel from one road to another. Roads may be represented by (and divided into) road segments, and in some examples road segments are portions of roads that are uninterrupted by intersections with other roads. For example, a road segment would extend between two adjacent intersections on a surface street or between two adjacent entrances/exits on a highway.

A map of a geographic region may be represented using a graph of the road segments (also herein referred to as a road graph). In some embodiments, the nodes of a road graph are road segments and edges between nodes represent intersections of road segments. In some embodiments, nodes of the road graph represent intersections between road segments and edges represent the road segments themselves. The map data store 210 also stores properties of the map, which may be stored in association with nodes or edges of a road graph. Map properties can include road properties that describe characteristics of the road segments, such as estimated travel time, speed limits, road directionality (e.g., one-way, two-way), traffic history, traffic conditions, addresses on the road segment, length of the road segment, and type of the road segment (e.g., surface street, residential, highway, toll). The map properties also can include properties about intersections, such as turn restrictions, light timing information, throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topological properties. In some cases, map properties may be used as weighting values, as for comparing travel time and optimizing routes for distance and/or trip duration.

The route-based trip duration estimation module 215 estimates trip duration based on information about map properties stored in a road graph, in accordance with an embodiment. Such calculations may be achieved using a network-based estimation algorithm to traverse the graph and determine expected time or cost from the route origin to the destination. For example, routing algorithms such as Dijkstra, Bellman-Ford, A*, and the like may be used to determine an optimal route from an origin to a destination based on characteristics of one or more road graphs. In some embodiments, such routing algorithms may choose a route by optimizing for the shortest travel time. In some embodiments, routing algorithms may be used to determine a route (e.g., based on shortest distance) and the route-based trip duration estimation module 215 may sum a travel time associated with each road segment included in the determined route to calculate an estimated trip duration. The estimated trip duration determined by the route-based trip duration estimation module 215 may be used by the real-time and historical models as discussed below. In some embodiments, models learn how actual trip duration deviates from the estimate from the route-based trip duration estimation module 215 to learn adjustments to the route-based trip duration using the estimated trip duration from the route-based trip duration estimation module 215.

The feature generation module 220 generates feature vectors for use in training models and predicting trip durations. For example, feature vectors generated by the feature generation module 220 may be used to train the real-time model 225, the historical model 230, and the selector 235. Feature vectors may include various types of features such as route features, trip context features, provider features, etc. In some embodiments, route features are features that can be determined based on information stored in the map data store, such as road graphs. Some examples of route features include a trip duration predicted for a route by the route-based trip duration estimation module 215, an estimated route distance, a Haversine distance between an origin and a destination, a latitude and longitude of an origin location, a latitude and longitude of a destination location, a number of left turns along a route, a number of right turns along a route, a number of transitions between road classes (e.g. from a dirt road to a highway, etc.), a proportion of highway and local roads, and so forth. In some implementations the route features describe a route for the trip without analyzing specific expected costs or time of travel for road segments. In this way for these implementations, the features generated by the feature generation module 220 for use by the real-time model 225 and the historical model 230 may describe the route differently than the route-based trip duration estimation module 215.

Trip context features are related to a specific trip, and include features such as trip type (e.g., carpool, delivery), time of day, day of week, and vehicle type. Provider features may describe individual providers or categories of vehicle providers. Some examples of provider features may include an average difference between an estimated trip duration and the provider's actual trip duration, an average time it takes a provider to begin a trip after receiving a trip request, a total distance travelled by a provider in a past week, a number of trips a provider provides per day, a total number of trips facilitated by the provider, a number of years of experience of the provider, a sum or average of ratings associated with a provider, provider connections on a social networking system, and the like. In some embodiments, provider features may be used to determine a personalized trip duration for the provider. It is beneficial to train historical models 230 and real-time models 225 using provider features, because the personalized models can produce more accurate trip duration estimates.

In addition, the trip features may also include the estimated duration for a trip from the route-based trip duration estimation module 215 or otherwise provided as an input to a model. When this initial trip duration estimate is included in the feature vector for a trip, the model may learn how the prediction from that system may be improved.

The real-time model 225 is trained using feature vectors generated from data that describes recently completed trips to estimate trip duration for future trips. The trip data used to train the real-time model 225 may thus be trained using data from a training window of time that is near-in-time to the trip for which a duration is predicted. For example, the real-time model 225 might use feature vectors generated using data from trips that completed within five, ten, and/or fifteen minutes prior to a current time. When traffic conditions vary, which may cause trip durations to differ from typical values (e.g., during a large event, when a traffic accident occurs, etc.), the real-time model 225 can account for these changes relatively quickly because it uses such recent data based on trips that have completed recently. In some embodiments, the real-time model may output information about confidence intervals for trip duration estimates, such as by using techniques like quantile regression to predict trip duration estimates at multiple quantiles. The quantiles may provide various confidence levels of the trip duration. For example, if a model has a 90 percent confidence that the trip can be completed in no longer than some time length, then the model will output that time length as the 90th percentile (quantile) of the predicted trip duration. Likewise, another model for the 10th percentile can also be built. For an upcoming trip, a 10th percentile lower bound and a 90th percentile upper bound can be predicted using these models. The real-time model 225 is trained more frequently than the historical model 230 and may be re-determined, for example, ten, twenty, or a hundred times more frequently than the historical model 230. For example the real-time model may be retrained each five, ten, fifteen, thirty minutes, or hour, while the historical model may be retrained each day, week, or month.

The historical model 230 predicts trip duration estimates based on historical trip data. In some embodiments, the historical model 230 uses the same features as the real-time model, except that the training data used to train the historical model 230 may include a larger timeframe of data than the real-time model 225. For example, the historical model 230 may be trained once a week, using a timeframe of trip data for the previous two weeks. In some embodiments the historical model 230 may be trained at varying intervals and/or using data from a number of past weeks, months, years, etc. Since the historical model 230 bases its trip duration predictions on trips that occur over a long time range, the historical model 230 is less affected by anomalous events that can skew trip durations temporarily.

The selector 235 is a model that is trained to determine whether trip duration estimates from the real-time model 225 or from the historical model 230 are more likely to accurately represent actual trip duration in a given case. In one embodiment, the selector 235 determines whether the system 130 should use the real-time model 225, the historical model 230, or a combination of the results of the two models to estimate a trip duration. For example, the selector 235 may output a binary value indicating that either the real-time model 225 or the historical model 230 should be used to predict the trip duration for an upcoming trip. As another example, the selector 235 may output a value indicating a likelihood that the real-time model 225 will predict trip duration more accurately than the historical model 230 (e.g., a percent probability), and a probabilistic method for combining the results of the real-time model 225 and the historical model 230 may be used (e.g., a weighting factor may be assigned to the results of the models for combining the results). In one embodiment, trip duration estimates produced by the real-time model 225 and the historical model 230 are used as inputs to the selector. In such embodiments, the selector may output the recommended trip duration estimation or weighting factors for combining the two trip duration estimations.

In some embodiments, quantile regression may be used to provide confidences that can be associated with trip duration estimates. For example, the real-time model 225 and historical model 230 may output values representing trip duration estimates for certain percentiles (e.g., P5, P10, P95, etc.). The selector 235 may output a final confidence interval by predicting whether the real-time model 225 or the historical model 230 will have a confidence interval that is likely to cover the actual trip durations, and applying the selected model to current data to determine the final confidence interval.

The trip duration model generator 240 trains the real-time model 225 and the historical model. Although the particular data sets for the historical model 230 and the real-time model 225 differ, the models may be trained by the same process, since they may use the same types of data as input variables and output values. In one embodiment, the models are trained using machine learning techniques in which data is incorporated into a model in batches as the data is received by the system 130. In one embodiment, the trip duration model generator 240 may use online machine learning techniques to incorporate data into a model as the data is received by the system 130. Some examples of machine learning algorithms that may be used to train the models include gradient boosting trees, nearest neighbor, naïve Bayes, etc. Data feature vectors, generated by the feature generation module 220 to train the real-time model 225 and the historical model 230, include input values such as the features previously detailed in the description of the feature generation module 220, and associated output values, such as the actual trip duration of a completed trip. Such feature vectors are used as inputs to the machine learning algorithms. In some embodiments, the trip duration model generator 240 trains the historical model 230 with batches of data that are larger than batches used to train the real-time model 225. For example, a larger data set may be used to train the historical model 230 because the historical model 230 may be retrained once every few weeks on data collected over the course of the weeks.

The selector training module 245 trains the selector 235 by applying the real-time model 225 and historical model 230 to a set of feature vectors from recently completed trips. The selector training module 245 compares the results of the historical model 230 and the results of the real-time model 225 with the actual trip durations of other recently completed trips. In one embodiment, the selector 235 is trained to output a value indicating whether the real-time model 225 or historical model 230 predicted the trip duration more accurately. The selector 235 may be trained by providing training data indicating the desired output value (e.g., the actual result that the real-time or historical model was more accurate) for a set of trips. In some embodiments, the selector 235 is trained to output a value indicating how much better or worse the real-time model 225 performed than the historical model 230 and thus which of the two models should be used to estimate a trip duration. In embodiments in which the real-time model 225 and the historical model 230 output trip duration estimates associated with quantiles, the selector training module 245 compares the quantile output of the historical model 230 and the real-time model 225 and picks the model with an output quantile that most accurately includes the actual trip duration. The selector training module 245 trains the selector 235 using the results of the comparison, information extracted from the comparison (e.g., a difference between the predictions of the historical model 230 and the real-time model 225), and the features generated by the feature generation module 220. In some such embodiments, the selector training module 245 may use a weighting to determine how trip duration estimates associated with different quantiles from each model should be combined. For example, the selector training module 245 may weight output quantiles of historical and real-time models according to the output probability of the selector 235.

The system 130 may generate multiple real-time models 225, historical models 230, and selectors 235 that are trained to estimate specific categories of trips, such as short trips (e.g., 10-15 minute trips) and long trips (e.g., 20-40 minute trips). For example, a historical model 230 for predicting trip duration of short trips may use only characteristics of past trips that had estimated durations of less than 15 minutes as training data. Similarly, a real-time model 225 and a selector 235 may be trained to estimate durations of short trips using only trips that have completed within a 15 minute training window as training data, according to one embodiment. When estimating trip durations in response to trip duration queries from users, the system 130 may determine which category of models to use (e.g., short trips or long trips) based on the estimated trip duration of the route-based trip duration estimation module 215.

The trip duration prediction module 250 applies the selector 235, real-time model 225, and historical model 230 to trip duration queries received by the system 130 to determine an estimated trip duration. The trip duration prediction module 250 applies the selector 235 to features of an incoming trip request or trip duration query. Features of a trip duration query may include an origin, a destination, a type of requested service, a time of day, and the like. In one embodiment, in which the selector 235 receives a real-time model 225 trip duration estimate and a historical model 230 trip duration estimate as inputs, the selector 235 may output one of the two determined trip duration estimates, or a combination of the estimates. Note that such inputs received from the real-time model 225 and historical model 235 may be individual trip duration estimations or may be quantiles related to an estimated trip duration. In some embodiments, the selector 235 outputs a binary value indicative of whether the real-time model 225 or the historical model 230 should be used to determine an estimated trip duration. Alternatively, the selector 235 may output a weighting factor (e.g., a percentage) that indicates a ratio by which the trip duration estimations of the real-time model 225 and the historical model 230 should be combined (e.g., as by weighted average). In such embodiments, the trip duration prediction module 250 may apply the real-time model 225 or the historical model 230 to the feature vector describing the trip duration query subsequent to the application of the selector 235. In some cases, the selector 235 may output a confidence interval for estimated trip durations rather than outputting only a single estimated trip duration value.

Figure 3:
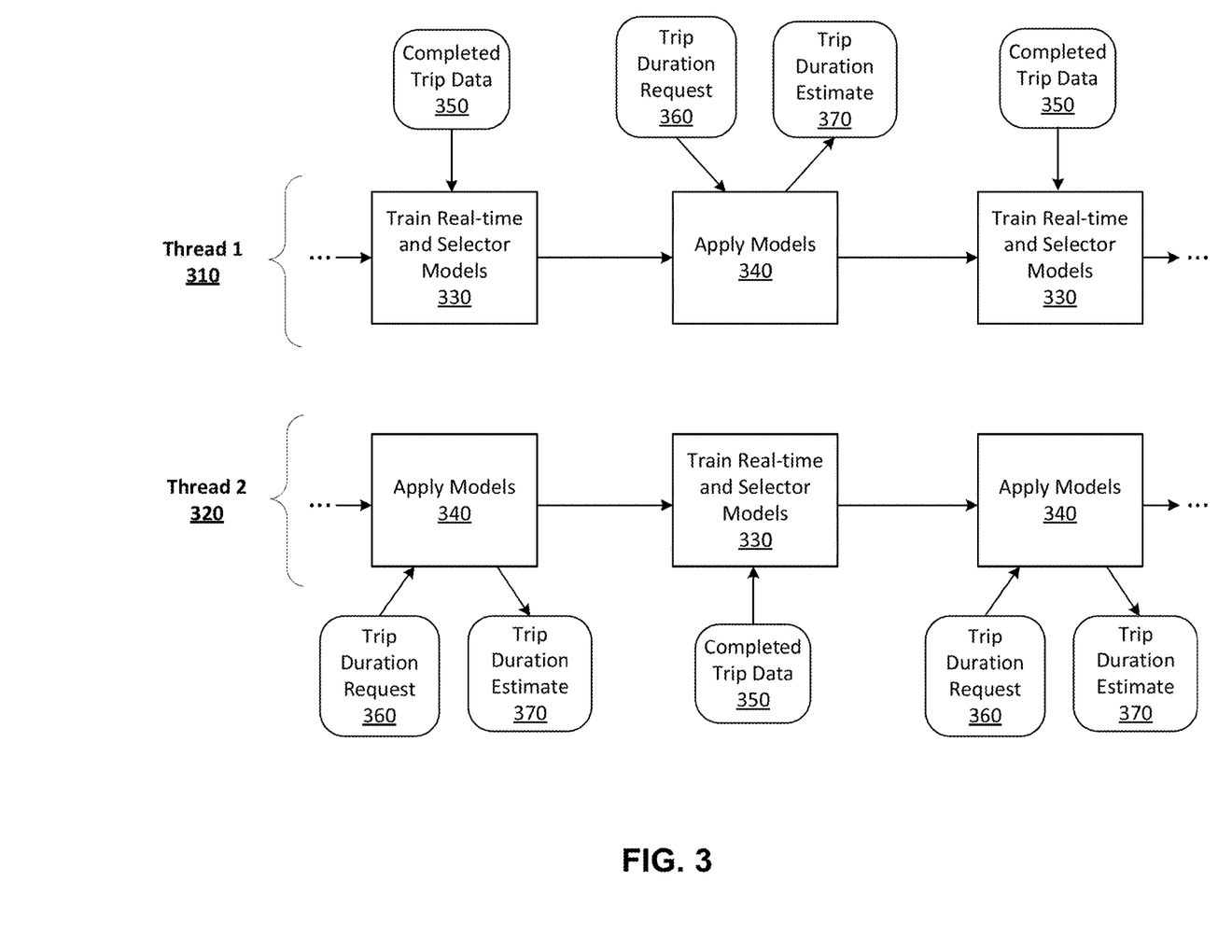
FIG. 3 is a high level data flow diagram illustrating two threads alternating roles between phases of model training and estimating trip durations, in accordance with an embodiment.

FIG. 3 is a high level data flow diagram illustrating two threads alternating roles between phases of model training and estimating trip durations, in accordance with an embodiment. In some embodiments, multiple threads take turns training the real-time models 225 and selector models 235. In other embodiments, a thread may be dedicated to training models while a different thread is dedicated to using the trained models to make predictions. Notably, although FIG. 2 depicts only one of each component module and/or data store, the system 130 may execute multiple threads for training and applying models, and each thread may have its own real-time model 225, selector 235, trip duration model generator 240, selector training module 245, and trip duration prediction module 250 (e.g., models associated with different threads may be trained and used independently of one another). The example of FIG. 3 shows a first thread 310 and a second thread 320, executing at the same time. While the first thread 310 trains its respective real-time and selector models 330, the second thread 320 applies its own real-time model 225 and selector model 235 to incoming trip requests and/or queries about trip durations. A model that is being applied to trip duration requests may be thought of as an active model, while models in the training phase may be thought of as inactive models.

For example, the first thread 310 may begin by training a real-time model 225 and a selector 235. The first thread 310 uses feature vectors from completed trip data 350 that is related to recently completed trips to train the models. A process for training a real-time model 225 and a selector 235 is presented in further detail in the description of FIG. 4A. While the first thread 310 trains a real-time model 225 and a selector 235, the second thread 320 applies its own most recently trained real-time model 225 and selector 235, as well as the historical model 230 to incoming trip duration requests 360. The second thread 320 uses the models to determine trip duration estimates 370 in response to received trip duration requests 360 until the first thread 310 and the second thread 320 switch their phases of execution such that the first thread begins to apply 340 its most recently trained models to incoming trip duration requests 360 received by the system 130 and the second thread begins to train 330 its respective real-time model 225 and selector 235 on recently completed trip data 350. Various embodiments may include different ways of controlling when threads switch between the two phases of training and applying models. In some embodiments, the threads trade phases of execution when a thread in a training phase has received enough incoming training data to adequately train the selector 235 and the real-time model 225. For example, the threads may trade roles after the thread in the training role has received a predetermined number of trips that completed within the training phase and used the feature vectors for these trips to train the models. In some embodiments, the threads may switch roles after a predetermined amount of time.

Figure 4A:
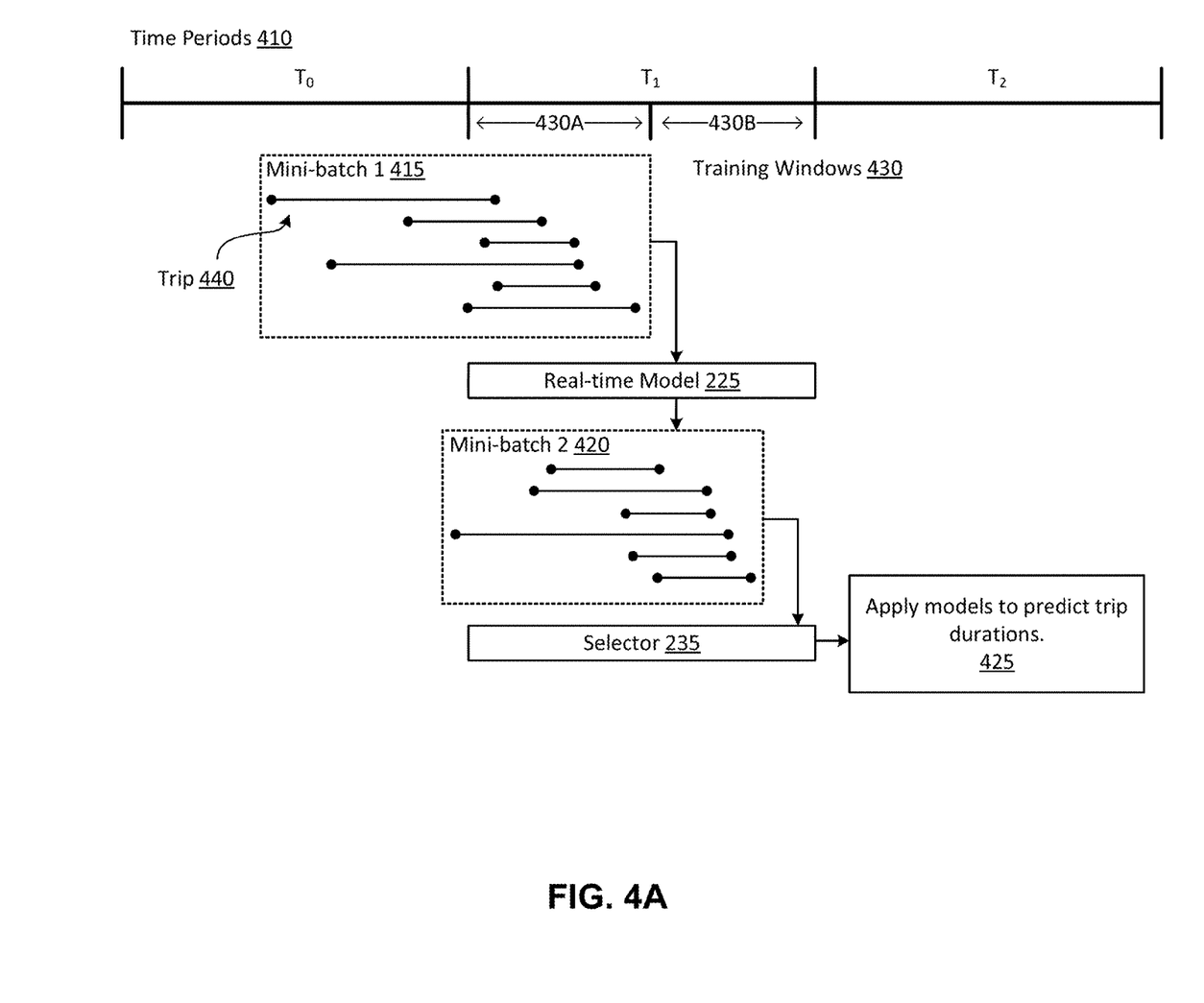
FIG. 4A is a data flow diagram illustrating how a real-time model and a selector are trained, in accordance with an embodiment.

FIG. 4A is a data flow diagram illustrating how the real-time model 225 and selector 235 are trained, in accordance with an embodiment. Specifically, FIG. 4A depicts a process by which one thread's real-time model 225 and selector 235 are trained and then applied to incoming trip duration requests. FIG. 4A includes a timeline divided into sequential time periods 410, such as $T_0$, $T_1$, and $T_2$. In some embodiments, a transition from one time period to a next time period may indicate that threads have swapped the roles of training and applying their respective models. For example, the real-time model 225 and the selector 235 are trained by the thread in time period 410 $T_1$ and applied by the thread in time period 410 $T_2$.

The real-time model 225 and selector 235 are trained with data from recently completed trips 440. In FIG. 4A, a trip 440 is represented by a line connecting two dots, the dots representing starting and ending times of the trip. The training data is collected and incorporated into the models as trips complete. Since completed trips have an actual trip duration, these trips may be used to train models that predict actual trip duration for near-in-time use of upcoming trips. For example, these trips may have an initial expected duration based on the route-based trip duration estimation module 215, and an actual trip duration, a comparison of which represents how actual travel conditions resulted in a different travel duration. By including these actual and estimated duration values in the generation of a real-time model, the real-time model can predict the actual duration for trips in a next time period.

For the purposes of this disclosure, a training window 430 is a frame of time in which data is collected for training a model. In FIG. 4A, two example training windows 430 are illustrated (e.g., 430A and 430B). In some embodiments, trip data is used to train a model if the trip was completed within a current training window 430, such as training window 430A in FIG. 4A. In some embodiments, training windows 430 may overlap in time with multiple time periods 410. For example, a training window 430 may be defined as beginning 45 minutes before a current time period 410, and extending to the end of the current time period 410, such as training window 430A in the example illustration. In some embodiments, the real time model 225 and the selector 235 are trained using data from trips that both began and ended within a training window 430 (whereas FIG. 4A depicts an embodiment in which the models are trained using data that ended but did not necessarily begin within a training window 430). In some embodiments, the training window 430 may be a sliding window of time, rather than a fixed window of time. For example, a sliding training window 430 may collect all trips that have finished within a past ten minutes of the current time for use in a training set.

In the illustrated embodiment, the training data is separated into two mini-batches of data. A first mini-batch 415 of trip data is used by the trip duration model generator 240 to train the real-time model 225 and a second mini-batch 420 of trip data is used to train the selector 235. In some embodiments, a mini-batch is associated with a training window 430 (e.g., the first mini-batch 415 and a first training window 430A as shown in FIG. 4A). That is, trip data collected within training window 430A becomes a part of the first mini-batch 415. In some embodiments, rather than collecting mini-batch data within a predefined training window 430, the first mini-batch 415 data is collected until a number of trips have completed and trip data collected subsequently is used for the second mini-batch 420. The feature generation module 220 extracts features from completed trips 440 associated with the first mini-batch 415. Features about a trip that may be used to train the real-time model include route features, trip context features, provider features, and an initial predicted duration for the trip as detailed above in the description of FIG. 2.

Subsequent to the training of the real-time model 225, a second mini-batch 420 data set is used by the selector training module 245 to train the selector 235. In the example of FIG. 4A, the selector 235 is trained using trip data from trips that completed during a second training window 430B. The selector training module 245 trains the selector 235 by applying the historical model 230 and the real-time model 225 to data about trips 440 in the second mini-batch 420 and comparing the trip duration estimations produced by the models against the actual trip durations of the trips 440 in the second mini-batch 420.

The selector 235 is trained to predict whether the historical model 230 or the real-time model 225 will estimate a trip duration more accurately, based on features related to a trip request. In some embodiments, the selector 235 is trained to output a binary value, for example where a one might indicate that the real-time model 225 should be used and a zero might indicate that the historical model 230 should be used. In some embodiments, the selector 235 is trained to output a predicted ratio by which results of the real-time model 225 and the historical model 230 should be combined to predict a trip duration. In embodiments in which trip duration estimates generated by the real-time model 225 and the historical model 230 are used as inputs to the selector 235, the selector 235 may be trained to output an estimated trip duration based on its own determination of whether to use the input estimate from the real-time model 225, the input estimate from the historical model 230, or a combination of both. In cases in which the selector 235 receives quantile values as input from the historical model 230 or the real-time model 225, the selector may be trained to combine the values, for example, using a weighting scheme.

When a new trip request and/or trip duration query is received by the system 130, the trip duration prediction module 250 applies 425 the models to the incoming feature vectors generated from trip duration request data to predict a trip duration. As described above, depending on the embodiment, the selector 235 may output an estimated trip duration, or the selector 235 may output a value indicative of which model to use to determine a trip duration estimate (e.g., only the real-time model 225, only the historical model, or a probabilistic combination of the real-time model 225 and the historical model 230). In the latter case, the trip duration prediction module 250 applies the identified model or models to the incoming data to determine an estimated trip duration. In some embodiments, the selector 235 or the trip duration prediction module 250 may use quantile regression techniques to determine estimated trip durations and may output multiple estimated trip durations, each associated with a confidence level or quantile in which the trip is expected to complete.

By using quantile regression, the system 130 can predict an upper bound and lower bound of predicted trip duration estimates. In embodiments for which a final output of the trip duration prediction module 250 includes multiple quantile values (e.g., a high quantile value to represent an upper bound and a low quantile value to represent a lower bound), the system 130 may assign services to certain providers based on confidence intervals associated with trip duration estimates. For example confidence intervals and estimated trip durations may be used to assign providers to provide transportation for certain trips or services. That is, more time-sensitive tasks, such as transporting a rider may be assigned to providers who are more likely to arrive at a destination near to the estimated arrival time, whereas providers with a wider confidence interval may be assigned less time-sensitive tasks, such as delivering food orders. As another example, riders may be assigned to a carpool service in view of estimated trip durations to ensure that the transportation is on time for all involved riders. As a third example, quantile regression results may be used to improve suggestions for when a provider should leave to pick up a rider who has scheduled a transportation ahead of time.

Figure 4B:
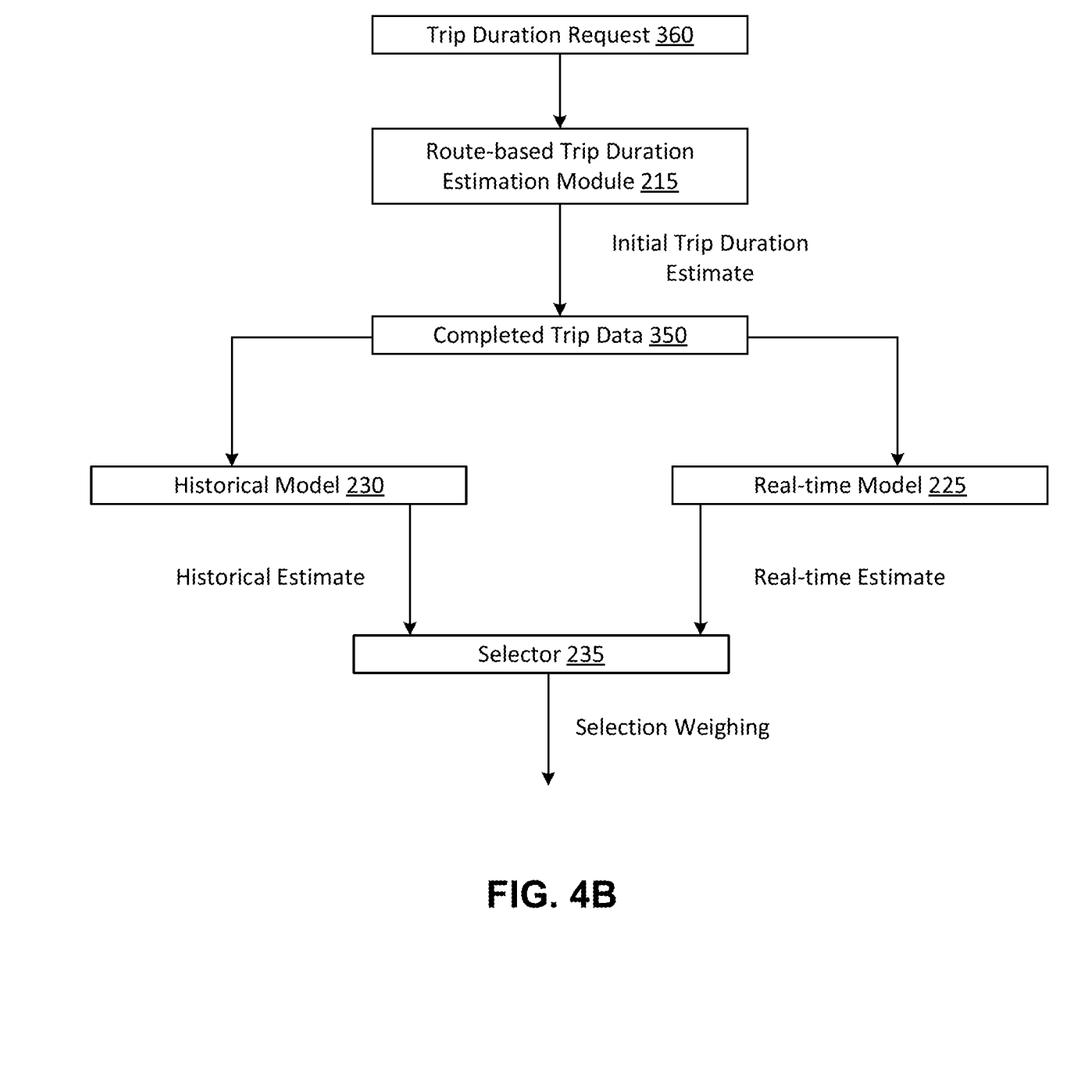
FIG. 4B is a data flow diagram illustrating high-level interactions between trip duration estimation models, in accordance with an embodiment.

FIG. 4B is a data flow diagram illustrating high-level interactions between trip duration estimation models, in accordance with an embodiment. A trip duration request 360, which may for example include an origin location and a destination location, is received by the system 130. The route-based trip duration estimation module 215 uses information from the trip duration request 360 to determine an initial trip duration estimate by applying a network-based estimation algorithm to data stored in the map data store 210. In some embodiments, the route-based trip duration estimation module 215 additionally uses machine learned models that can determine an initial trip duration estimate using map data as input values.

The historical model 230 and the real-time model 225 are applied to features extracted from completed trip data 350 (e.g., mini-batch data, historical trip data, etc.) and/or the initial route-based trip duration estimate to determine a historical estimate and a real-time estimate of trip duration. That is, an initial trip duration estimate determined by the route-based trip duration estimation module 215 may form a part of a feature vector that is passed to the models. The historical estimate and real-time estimate produced by the historical model 230 and the real-time model 225 are provided as inputs to the selector 235. In some embodiments, the selector 235 determines a combination of the historical estimate and the real-time estimate that is likely to best represent the actual trip duration. For example, the selector 235 may determine weighting factors to use to combine the trip duration estimate produced by the historical model 230 and the trip duration estimate produced by the real-time model 225.

Figure 5:
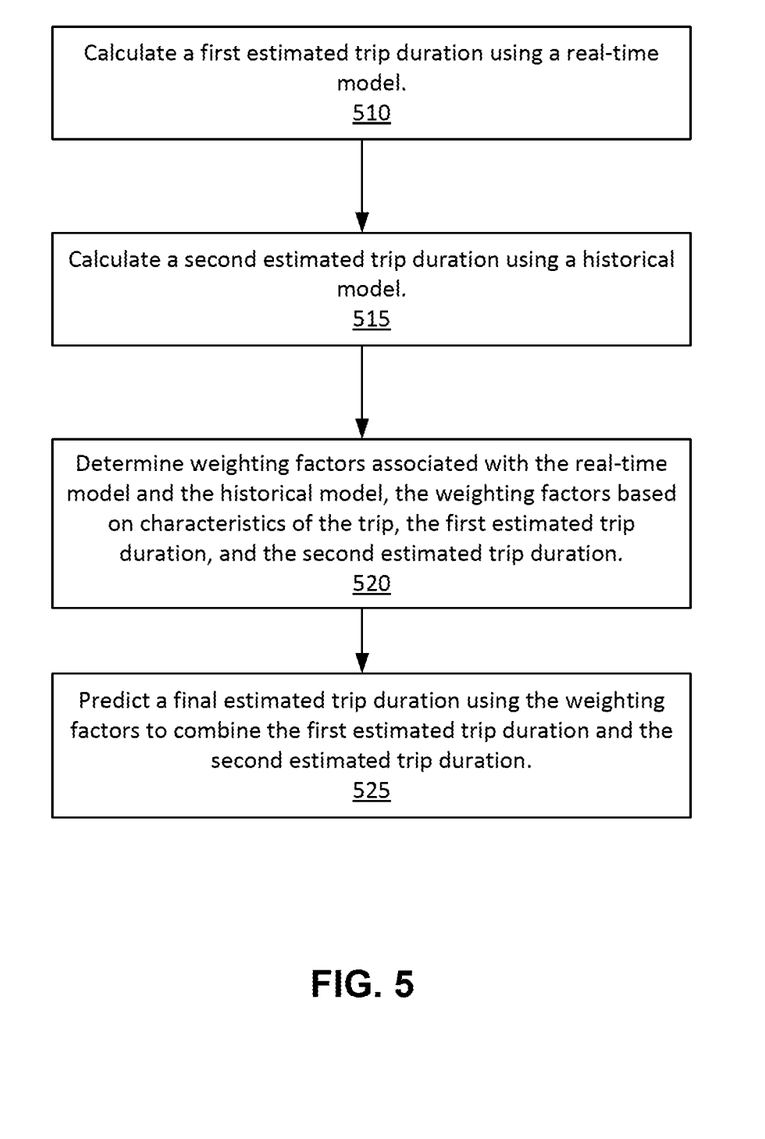
FIG. 5 is a high level flow chart that describes a process for determining a trip duration estimate using real-time traffic data and historical traffic data, in accordance with an embodiment.

FIG. 5 is a high level flow chart that describes a process for determining a trip duration estimate using real-time traffic data and historical traffic data, in accordance with an embodiment. The system 130 calculates 510 a first estimated trip duration using a real-time model 225. The real-time model may be frequently retrained to incorporate data about current traffic conditions.

The system 130 calculates 515 a second estimated trip duration using a historical model 230. A historical model 230 may be retrained at longer intervals than the real-time model 225 and to thereby include additional training data in its training window of training data for the historical model. For example, the historical model may be trained every week. A historical model may incorporate training data from trips that occurred within that week or within a training window of prior weeks, months, years, etc.

The system 130 determines 520 a weighting factor associated with the real-time model 225 and a weighting factor associated with the historical model 230. For example, a weighting factor may be a value output by the selector 235. The weighting factors determined by the selector 235 may be based on characteristics of the trip, the first estimated trip duration, and the second estimated trip duration. A final estimated trip duration is predicted 525 using the weighting factors to combine the first estimated trip duration and the second estimated trip duration. A combination of the real-time model 225 and the historical model 230 may include exclusive use of one model or a probabilistic combination of the trip duration estimates determined by each model (e.g., based on the weighting factors). In some embodiments, another trained model (e.g., a selector 235) that includes trip duration estimates of the historical model 230 and the real-time model 225 as inputs determines a combination of the real-time model 225 estimate and the historical model 230 estimate to use when determining an estimated trip duration for the trip and outputs an estimated trip duration using weighting factors it learns.

Figure 6:
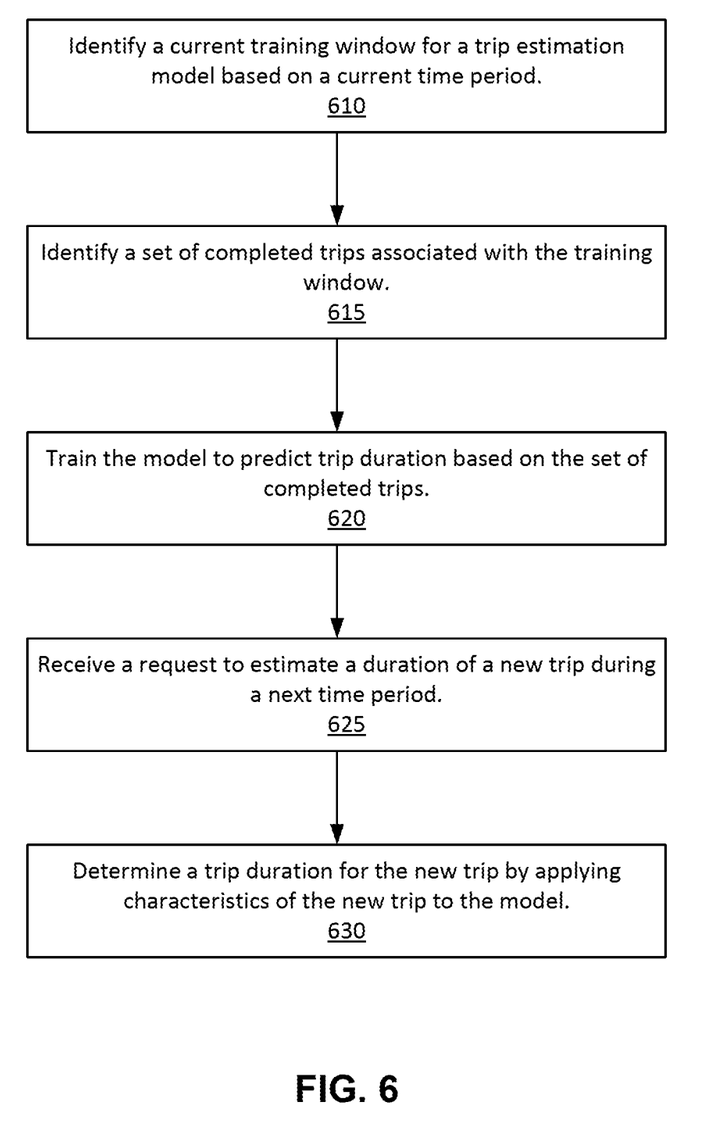
FIG. 6 is a high-level flow chart that describes a process for iteratively generating trip duration estimates using real-time traffic data, in accordance with an embodiment.

FIG. 6 is a high-level flow chart that describes a process for iteratively generating trip duration estimates using real-time traffic data. The system 130 identifies 610 a current training window for a trip estimation model based on a current time period. In some embodiments, a current training window for a trip estimation model may be determined based on a range of trip lengths that the model is being trained to estimate. For example, a model that predicts trip lengths for trips that the route-based trip duration estimation module 215 estimates will take 10 to 15 minutes, may have a twenty minute training window, according to one embodiment.

The system 130 identifies 615 a set of completed trips associated with the training window and trains 620 the model to predict trip duration based on the set of completed trips. In some embodiments, the model is trained as competed trips occur. That is, when a trip associated with the training window is completed, characteristics of the trip may be incorporated into the trip estimation model before other trips associated with the training window have completed.

The system 130 receives 625 a request to estimate a duration of a new trip during a next time period. For example, the system 130 may receive a trip request or a trip duration query from a user device 110. The system 130 determines 630 a new trip duration for the new trip by applying characteristics of the new trip to the model.

Figure 7:
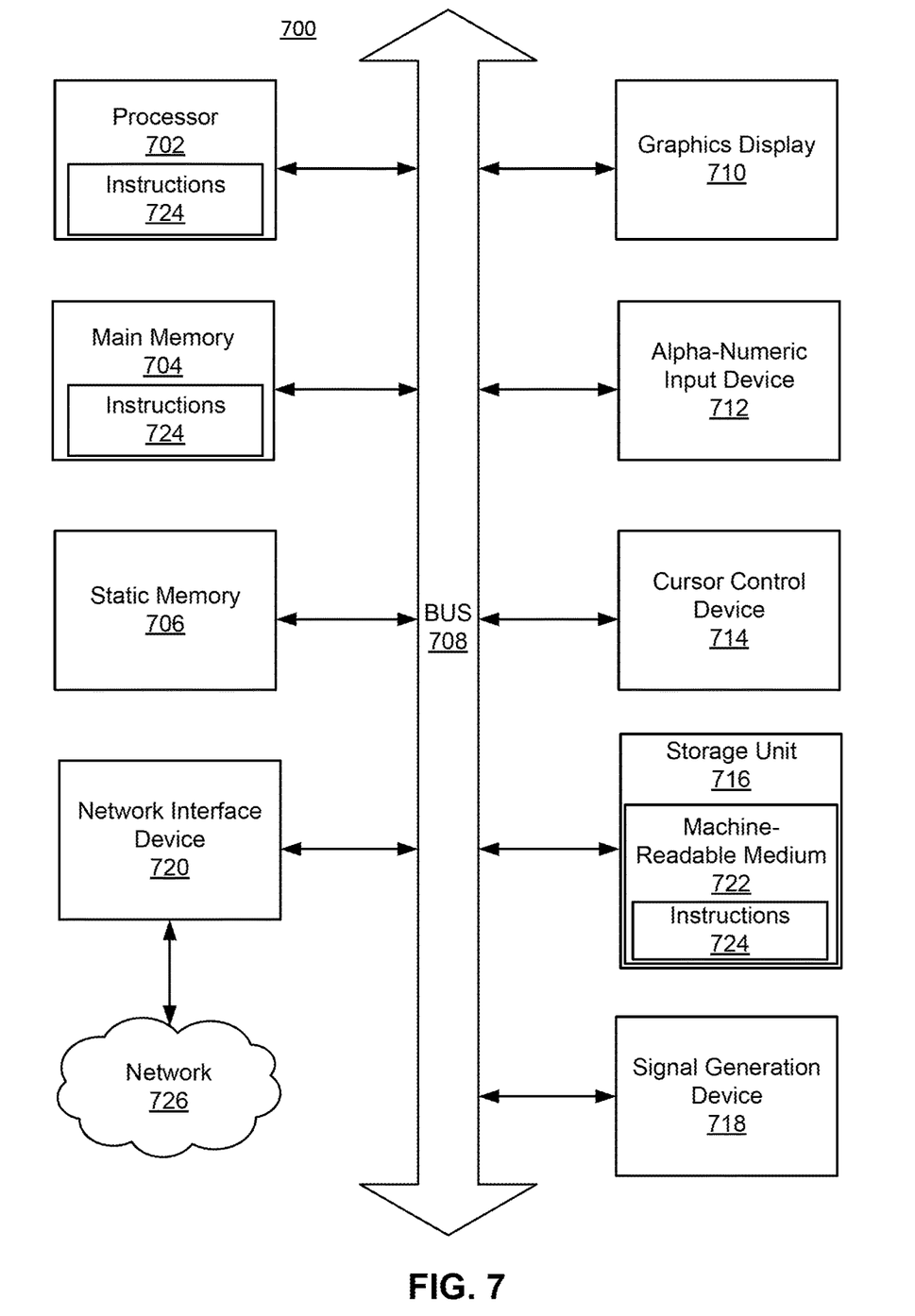
FIG. 7 is a block diagram illustrating components of an example machine able to read instructions from a machine-readable medium and execute the instructions in one or more processors, in accordance with an embodiment.

FIG. 7 is a block diagram illustrating components of an example machine able to read instructions from a machine-readable medium and execute them in one or more processors (or controllers). Specifically, FIG. 7 shows a diagrammatic representation of system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the route-based trip duration estimation module 215, the feature generation module 220, the trip duration model generator 240, the selector training module 245, and/or the trip duration prediction module 250. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
calculating a first estimated trip duration for a trip using a real-time model;
calculating a second estimated trip duration for the trip using a historical model;
determining weighting factors associated respectively with the real-time model and the historical model, the weighting factors determined by inputting the first estimated trip duration for the trip and the second estimated trip duration for the trip into a trained selector model that generates a value indicating whether the first estimated trip duration or the second estimated trip duration more accurately predicts a trip duration of the trip and outputs the weighting factors based on the generated value, wherein the selector model is trained to generate weighting factors associated with the real-time model and the historical model based on features of trips in a set of trips that completed within a training period, trip duration estimates predicted by the real-time model for the trips in the set of trips, trip duration estimates predicted by the historical model for the trips in the set of trips, and determinations of whether the trip duration estimates predicted by the real-time model were more accurate relative to actual trip durations of the trips in the set of trips as compared to the trip duration estimates predicted by the historical model; and
predicting the final estimated trip duration by using the weighting factors to combine the first estimated trip duration and the second estimated trip duration.

2. The method of claim 1, further comprising:
predicting an initial trip duration for the trip based on a network-based estimation algorithm;
wherein the real-time model and the historical model use the predicted initial trip duration to generate the first estimated trip duration and the second estimated trip duration.

3. The method of claim 2, wherein the network-based estimation algorithm bases trip duration predictions on a graph that models a path between an origin location of the trip and a destination location of the trip as a series of weighted nodes and edges.

4. The method of claim 1 wherein the weighting factor specifies the exclusive use of one of the group consisting of: the real-time model and the historical model.

5. The method of claim 1, wherein the real-time model is trained using features of trips that completed within a first time period, and the historical model is trained using features of trips that completed within a second time period, the second time period being longer than the first time period.

6. A non-transitory computer-readable storage medium storing computer program instructions executable by one or more processors of a system to perform steps comprising:
calculating a first estimated trip duration for a trip using a real-time model;
calculating a second estimated trip duration for the trip using a historical model;
determining weighting factors associated respectively with the real-time model and the historical model, the weighting factors determined by inputting the first estimated trip duration for the trip and the second estimated trip duration for the trip into a trained selector model that generates a value indicating whether the first estimated trip duration or the second estimated trip duration more accurately predicts a trip duration of the trip and outputs the weighting factors based on the generated value, wherein the selector model is trained to generate weighting factors associated with the real-time model and the historical model based on features of trips in a set of trips that completed within a training period, trip duration estimates predicted by the real-time model for the trips in the set of trips, trip duration estimates predicted by the historical model for the trips in the set of trips, and determinations of whether the trip duration estimates predicted by the real-time model were more accurate relative to actual trip durations of the trips in the set of trips as compared to the trip duration estimates predicted by the historical model; and predicting the final estimated trip duration by using the weighting factors to combine the first estimated trip duration and the second estimated trip duration.

7. The non-transitory computer-readable storage medium of claim 6, storing computer program instructions to perform steps, further comprising:

predicting an initial trip duration for the trip based on a network-based estimation algorithm;

wherein the real-time model and the historical model use the predicted initial trip duration to generate the first estimated trip duration and the second estimated trip duration.

8. The non-transitory computer-readable storage medium of claim 7, wherein the network-based estimation algorithm bases trip duration predictions on a graph that models a path between an origin location of the trip and a destination location of the trip as a series of weighted nodes and edges.

9. The non-transitory computer-readable storage medium of claim 6, wherein the weighting factor specifies the exclusive use of one of the group consisting of: the real-time model and the historical model.

10. The non-transitory computer-readable storage medium of claim 6, wherein the real-time model is trained using features of trips that completed within a first time period, and the historical model is trained using features of trips that completed within a second time period, the second time period being longer than the first time period.

11. The computer system of claim 6, wherein the real-time model is trained using features of trips that completed within a first time period, and the historical model is trained using features of trips that completed within a second time period, the second time period being longer than the first time period.

12. A computer system comprising:

one or more computer processors for executing computer program instructions; and a non-transitory computer-readable storage medium storing instructions executable by the one or more computer processors to perform steps comprising:

calculating a first estimated trip duration for a trip using a real-time model;

calculating a second estimated trip duration for the trip using a historical model;

determining weighting factors associated respectively with the real-time model and the historical model, the weighting factors determined by inputting the first estimated trip duration for the trip and the second estimated trip duration for the trip into a trained selector model that generates a value indicating whether the first estimated trip duration or the second estimated trip duration more accurately predicts a trip duration of the trip and outputs the weighting factors based on the generated value, wherein the selector model is trained to generate weighting factors associated with the real-time model and the historical model based on features of trips in a set of trips that completed within a training period, trip duration estimates predicted by the real-time model for the trips in the set of trips, trip duration estimates predicted by the historical model for the trips in the set of trips, and determinations of whether the trip duration estimates predicted by the real-time model were more accurate relative to actual trip durations of the trips in the set of trips as compared to the trip duration estimates predicted by the historical model; and predicting a final estimated trip duration by using the weighting factors to combine the first estimated trip duration and the second estimated trip duration.

13. The computer system of claim 12, storing instructions to perform steps, further comprising:

predicting an initial trip duration for the trip based on a network-based estimation algorithm;

wherein the real-time model and the historical model use the predicted initial trip duration to generate the first estimated trip duration and the second estimated trip duration.

14. The computer system of claim 13, wherein the network-based estimation algorithm bases trip duration predictions on a graph that models a path between an origin location of the trip and a destination location of the trip as a series of weighted nodes and edges.

* * * * *

UNITED STATES PATENT AND TRADEMARK OFFICE
CERTIFICATE OF CORRECTION

PATENT NO. : 10,816,351 B1  
APPLICATION NO. : 15/678250  
DATED : October 27, 2020  
INVENTOR(S) : Yao et al.

Page 1 of 1

It is certified that error appears in the above-identified patent and that said Letters Patent is hereby corrected as shown below:

On the Title Page

Item (56), Column 2, under "U.S. Patent Documents", Line 5, after "Kosseifi" insert -- et al. --.

Item (56), Column 2, under "U.S. Patent Documents", Line 7, after "Bouillet" insert -- et al. --.

In the Claims

In Column 16, in Claim 4, Line 51, after "claim 1" insert -- , --.

In Column 17, Claim 11, Lines 48-53, delete "11. The computer system of claim 6, wherein the real-time model is trained using features of trips that completed within a first time period, and the historical model is trained using features of trips that completed within a second time period, the second time period being longer than the first time period.".

In Column 18, in Claim 12, Line 1, delete "12." and insert -- 11. --, therefor.

In Column 18, in Claim 13, Line 39, delete "13. The computer system of claim 12," and insert -- 12. The computer system of claim 11, --, therefor.

In Column 18, in Claim 14, Line 48, delete "14. The computer system of claim 13," and insert -- 13. The computer system of claim 12, --, therefor.

In Column 18, Claim 14, Line 53, below "a series of weighted nodes and edges." insert -- 14. The computer system of claim 11, wherein the real-time model is trained using features of trips that completed within a first time period, and the historical model is trained using features of trips that completed within a second time period, the second time period being longer than the first time period. --.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*